May 11, 1954　　W. D. MULLINS, JR., ET AL　　2,677,963
MACH NUMBER DEVIATION MEASURING DEVICE
Filed Aug. 22, 1949
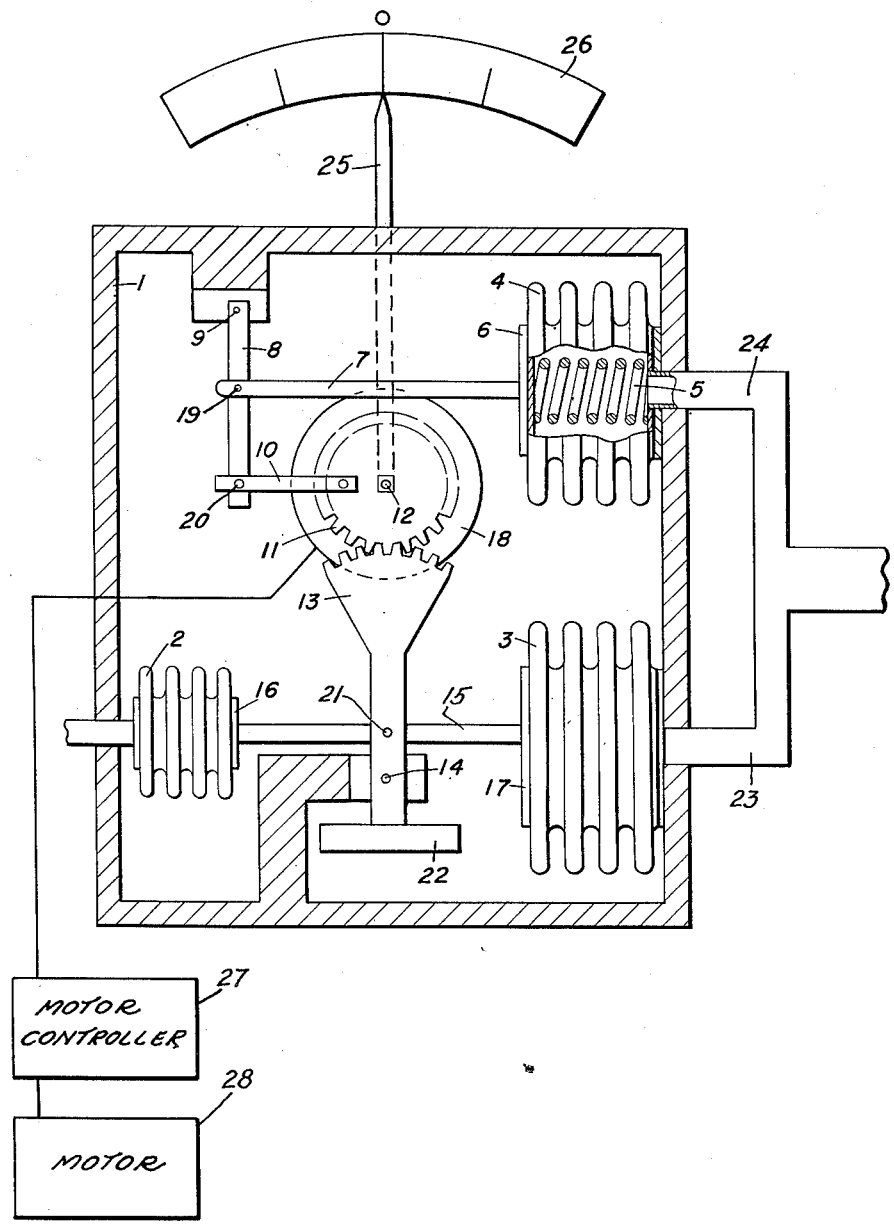
INVENTOR.
WILLIAM D. MULLINS, JR.
ROBERT E. SMITH
BY William R. Lane
ATTORNEY Patented May 11, 1954

2,677,963

UNITED STATES PATENT OFFICE 2,677,963

MACH NUMBER DEVIATION MEASURING DEVICE

William D. Mullins, Jr., and Robert E. Smith, Downey, Calif., assignors to North American Aviation, Inc.

Application August 22, 1949, Serial No. 111,706

9 Claims. (Cl. 73—182)

This invention pertains to the measurement of deviations in Mach number from a predetermined value.

A definite relationship exists between Mach number and the ratio of the total pressure of a ram pressure duct to the static air pressure. However, since static air pressure varies in magnitude from approximately 15 pounds per square inch at sea level to 3.5 pounds per square inch at 35,000 feet and to a fraction of a pound per square inch at 80,000 feet, simple differential pressure devices have been unsatisfactory for the precision measurement of Mach number and for the control of servo devices in response to deviations in Mach number. The precision of measurement of deviations in Mach number by presently known instruments at low altitudes cannot be duplicated at the extreme altitudes attained by modern aircraft.

It is therefore an object of this invention to provide a Mach number deviation measuring device which is substantially insensitive to changes in altitude and which is capable of the same precision in measurement at high altitudes as at low altitudes.

It is a further object of this invention to provide a servo device capable of maintaining the speed of an aircraft at a predetermined Mach number.

It is a further object of this invention to provide a device capable of maintaining the speed of an aircraft at a predetermined Mach number with a precision which is independent of the altitude of the controlled aircraft.

Other objects of invention will become apparent from the following description taken in connection with the accompanying single figure, which is a sectional schematic view of the invention.

Referring to the single figure, an evacuated chamber 1 encloses ram air bellows 2 and static air bellows 3 and 4. Bellows 2 and 3 are coaxially disposed and connected by rod 15. Air at static pressure is admitted in parallel to bellows 3 and 4 through ducts 23 and 24. Bellows 4 contains a spring 5 held in tension. Bellows head 6 is connected by rod 7 and pin 19 to lever 8 pivoted at 9. Lever 10 connected to lever 8 by pin 20 is driven by gear 11 which is free to rotate about shaft 12. Gear 11 engages the teeth of arm 13 which form a sector gear and which in turn rotates about point 14, is pivotally connected to rod 15 by pin 21, and is balanced by balance weight 22. Rod 15 is actuated by bellows heads 16 and 17 which move in response to the difference in force between ram air bellows 2 and static air bellows 3.

As an example, let it be assumed that the device is to be used to control the speed of aircraft so that the Mach number attained is always 2.85. This will result if the ratio of ram to static air pressure is maintained at approximately 10.75 to 1.0. It is therefore required that the cross-sectional area of static air bellows 3 be 10.75 times the cross-sectional area of ram air bellows 2 to balance the force between bellows heads 16 and 17 when the desired predetermined Mach number is reached. When the forces generated by bellows 2 and 3 are unbalanced, lever 10 exerts a tensile force and thereby provides a torque to gear 11 which, for small angles, is proportional to the angle through which gear 11 has turned. Rotation of gear 11 and shaft 12, in response to unbalanced forces between bellows heads 16 and 17 causes a rotation indicating device or means, such as induction type rotational pickoff 18, for example, a synchro transmitter of the type shown in Fig. 3.2, page 79 of Theory of Servomechanisms by James, Nichols, and Phillips, volume 25 of the MIT Radiation Laboratory Series, or pointer 25 and scale 26, to generate a signal or yield a measure of Mach number deviation which may be used for visual indication or may be connected to motor controller 27, such as shown in Fig. 1.2, page 9 of Theory of Servomechanisms, to control auxiliary equipment, for example, to control the flow of fuel to an engine, or to control the movement of aircraft control surfaces. However, while the ram air pressure at 35,000 feet amounts to something over 37 p. s. i. and the atmospheric pressure to 3.46 p. s. i., the pressure difference arising from a small change in Mach number is much greater than at an altitude of 80,000 feet where both ram air pressure and atmospheric air pressure are approximately one ninth as much. The variation in the differential of pressure to be detected at this high altitude therefore is much smaller for a given change in the ratio of the pressures than at lower altitudes and, if the sensitivity of the device to pressure change were the same at high altitudes as at the lower level, a considerable relative loss of response to deviation of Mach number would result at high altitude. To overcome this difficulty, the combination of static air bellows 4 and spring 5 are provided. Spring 5 is designed so that the torque it produces on gear 11 through its associated linkage balances the torque produced by the spring action of bellows 2 and 3 on gear 11 for small angular deflections of gear 11. Static air bellows 4 and spring 5 act in conjunction with rod 7 and levers 8 and 10 on gear 11. A restoring torque which, for small angles, is proportional to the angle through which gear 11 has turned, is therefore applied to gear 11 by the action of the static pressure in bellows 4 transmitted by the mechanical linkage. This torque is proportional to both the static pressure and to the angular deflection of the gear, for small angles. The line of action of the force exerted by lever 10 passes through the center of shaft 12 when the forces (not the pressures) exerted by bellows head 16 and bellows head 17 are equal. When the measured Mach number increases above the predetermined Mach number, gear 11 is turned counterclockwise and displaces the line of action of the force exerted by lever 10 from the center of shaft 12. When the measured Mach number decreases below the predetermined Mach number, gear 11 is turned clockwise and displaces the line of action of the force exerted by lever 10 from the center of shaft 12. The distance between the line of action of the force exerted by lever 10, and the center of shaft 12 is proportional to the sine of the angle through which gear 11 has turned and for small angles is substantially proportional to the angle itself. The force of spring 5 always aids the turning of gear 11 in response to changes of the ratio of pressure in bellows 2 to the pressure in bellows 3. The tension of spring 5 is adjusted to just overcome the spring action of the bellows itself in bellows 2, 3 and 4. The unbalanced force exerted by lever 10 upon gear 11 is proportional to the static air pressure in bellows 4. The torque exerted by lever 10 upon gear 11 is proportional to the force exerted by lever 10 upon gear 11, and for small angles it is proportional to the angle through which gear 11 has turned. The lateral movement of pivot 21 is proportional for small angles to the angle through which gear 11 has turned. The counterforce exerted by arm 13 upon rod 15 is proportional to the torque exerted by lever 10 upon gear 11. Thus, the counterforce exerted by arm 13 upon rod 15 is proportional to the static pressure within bellows 4 and to the lateral movement of pin 21. A spring constant proportional to the static pressure which decreases with altitude opposes the movement of rod 15 in response to a change in the ratio of pressure in bellows 2 to the pressure in bellows 3.

It is well known that $$M^2 = \frac{2}{\gamma-1}\left[\left(\frac{H}{p}\right)^{\frac{\gamma-1}{\gamma}} - 1\right]$$

(see High Speed Aerodynamics by W. F. Hilton—Longmans, Green & Co., publishers, 1951, p. 161) wherein M is the Mach number to be determined, $\gamma$ is the ratio of the specific heat of air at a constant pressure to the specific heat of air at a constant volume, $\gamma$ is substantially constant over the range of application, H is the ram pressure in bellows 2, and $p$ is the static pressure in bellows 3 and 4. Thus, if $$\frac{H}{p}$$

is defined, the Mach number is defined. This device defines $$\frac{H}{p}$$

and is therefore a Mach meter. Arm 13 will only be centered when the force exerted by bellows head 16 equals the force exerted by bellows head 17. The area of bellows head 16 is designated $A_{16}$, and the area of bellows head 17 is designated $A_{17}$. For the equilibrium position, $HA_{16} = pA_{17}$. This will only be true when $$\frac{H}{p} = \frac{A_{17}}{A_{16}}$$

Since $$\frac{A_{17}}{A_{16}}$$

is fixed, $$\frac{H}{p}$$

is completely determined at the equilibrium position. Any other value of $$\frac{H}{p}$$

will not balance applicants' device. Applicants' device also completely determines the change of $$\frac{H}{p}$$

$$\Delta\left(\frac{H}{p}\right)$$

as a linear function of the angle $\theta$ through which gear 11 has turned. Consider the balance of torques upon gear 11:

$$K_1(HA_{16} - pA_{17}) = K_2\theta + (K_3pA_6 - K_3F)\theta$$

wherein $K_1$ is a constant of proportionality which takes the gear ratio and moment arm lengths of its associated forces into account; $K_2$ is a constant which takes into account the spring constants of bellows 2 and bellows 3 as well as the gear ratio and moment arm lengths associated with these spring forces, $K_3$ is a constant which takes into account the moment arms associated with the forces generated by bellows head 6 and spring 5, $A_6$ is the area of bellows head 6, and F is the force generated by spring 5 less the force of the spring effect in bellows 4. $K_3F$ is designed to be equal in magnitude to $K_2$. Hence:

$$K_1(HA_{16} - pA_{17}) = K_3pA_6\theta$$

and $$\frac{H}{p}K_1A_{16} - K_1A_{17} = K_3A_6\theta$$

but $$\frac{H}{p} = \left(\frac{H}{p}\right)_0 + \Delta\left(\frac{H}{p}\right)$$

wherein $$\left(\frac{H}{p}\right)_0$$

is the equilibrium value to which applicants' device is designed, and $$\left(\frac{H}{p}\right)_0 = \frac{A_{17}}{A_{16}}$$

dividing through by $A_{16}$ and substituting $$\left(\frac{H}{p}\right)_0 + \Delta\left(\frac{H}{p}\right) \text{ for } \frac{H}{p}$$

$$\left(\frac{H}{p}\right)_0 K_1 + \Delta\left(\frac{H}{p}\right)K_1 - K_1\frac{A_{17}}{A_{16}} = \Delta\left(\frac{H}{p}\right)K_1 = K_3\frac{A_6}{A_{16}}\theta$$

Hence, applicants' device not only uniquely determines $$\frac{H}{p}$$

at its equilibrium position, but the deviation of $$\frac{H}{p}$$

from its predetermined value is uniquely determined as a linear function of $\theta$ for small values of θ. By designing the devices, which we have assumed to be linear, slightly non-linearly, the range of accurate measurement is extended. The resistance to small rotations of gear 11 offered by the system comprising lever 10, rod 7 and bellows 4 therefore decreases with increasing altitude and the device maintains its sensitivity of response to deviation of Mach number as the altitude increases.

Induction type rotational pickoff 18 is connected to gear 11 and the signal from pickoff 18 is used to control motor 28 by means of motor controller 27. Motor controller 27 may be a conventional servo amplifier, such as that shown in Fig. 1.2, page 9 of Theory of Servomechanisms, which supplies power to motor 28 in response to the deviation of pickoff 18 from a neutral position. Motor 28 may be a synchro and can be used to drive any desired device in response to the deviation of measured Mach number. The element which is driven by motor 28 may be, for example, a throttle of an aircraft engine or a hydraulic actuating mechanism for controlling the control surfaces of an aircraft. The magnitude of the control signal from pickoff 18 is as great per unit Mach number change, which is to say the sensitivity of response to deviation of Mach number is the same, at high altitude as at low altitude. The device therefore provides an arrangement for measuring deviations in Mach number which does not suffer from loss of sensitivity of response to deviation of Mach number at high altitude and can be used at very low pressure.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for detecting deviations in Mach number from a predetermined value with substantially equal sensitivity to deviation of Mach number throughout a wide range of altitude comprising means forming an evacuated chamber, closed bellows means therein connected to move in response to ram air pressure variations, second closed bellows means therein connected to move in response to static air pressure variations, said second bellows means bearing a definite predetermined size relation to and being connected to said first-named bellows means in such a manner that the force developed by said first-named bellows means is opposed to the force developed by said second-named bellows means and to cause the force generated by said first-named bellows means to equal the force generated by said second-named bellows means when said ram and static pressure corresponds to said predetermined Mach number from which deviations of Mach number are to be detected, indicating means interconnected with said two bellows means to indicate deviation from a neutral position which corresponds to said predetermined Mach number, and third bellows means connected to move in response to static air pressure and connected to said indicating means to apply a restraint directly in proportion to static pressure in opposition to movement of said indicating means from said predetermined value whereby said indicating means yields a measure of Mach number whose precision of response to deviations of Mach number is substantially independent of altitude.

2. A device as recited in claim 1 in which said third bellows means comprises a closed bellows connected in said means forming an evacuated chamber to receive static pressure, a mechanical linkage interconnecting said indicating means and said third bellows to cause the force of said third bellows to act in opposition to movement of said indicating means from said neutral position, and a spring connected to said linkage in the sense required to nullify the spring effect of said first two bellows means on said indicating means whereby the sensitivity of said indicating means to deviation in Mach number is substantially constant throughout a wide range of altitude.

3. A device as recited in claim 1 in which said indicating means comprises a rigid rod connecting the heads of said first and second bellows means, a sector gear pivotable with respect to said means forming an evacuated chamber and connected to said rod to be rotated by movement of said rod, an induction type rotary pickoff having a shaft, and a gear connected to said shaft engaged with said sector gear whereby a change in the ratio of pressures between said first and second bellows means produces a proportionate rotation of said pickoff.

4. Means for detecting deviations in Mach number from a predetermined value with substantially equal sensitivity throughout a range of altitude comprising means forming an evacuated chamber, a closed bellows therein connected to move in response to ram air pressure variations, a second closed bellows therein connected to move in response to static air pressure variations, said second bellows bearing a definite predetermined size relation to said first-named bellows which causes the force in said first-named bellows to equal the force of said second-named bellows at the reference Mach number from which variations are to be detected, said two bellows being mounted within said chamber in coaxially opposed relation to each other, a rotary electrical pickoff having a shaft, a rigid connector between said bellows, a mechanical linkage connected to transmit motion of said connector to said pickoff, and means responsive to static air pressure connected to said pickoff to restrain the motion of said pickoff by an amount proportional to static air pressure and proportional to the deviation of said shaft from its position when said Mach number is at its predetermined value.

5. A device as recited in claim 4 in which said means responsive to static air pressure comprises a third bellows connected in said means forming an evacuated chamber to receive static pressure, a spring enclosed within and opposed to the urge of said third bellows, the head of said third bellows extending into said means forming said chamber in proximity to said pickoff, and a mechanical linkage connected between the head of said third bellows and pickoff to transmit to said pickoff a restraining torque proportional to said static pressure in opposition to motion of said connector from a neutral position which corresponds to said predetermined Mach number whereby the sensitivity of said pickoff to deviation in Mach number as indicated by the electrical output of said electrical pickoff is substantially the same throughout a predetermined range of altitude.

6. Means for sensing deviations from a predetermined value of Mach number of an aircraft comprising means forming an evacuated closed chamber, a first bellows within said chamber, means connected to said first bellows to furnish ram air pressure thereto, a first bellows head in the end of said first bellows movable in response to variation in ram air pressure, a second bellows within said chamber, means for furnishing static air pressure to said second bellows, a second bellows head in said second bellows movable in response to variations in static air pressure and arranged to be coaxially opposed to said first bellows head, a segmental gear pivotable with respect to said chamber at a point between said bellows heads, a rod pivotally connected to said bellows heads and to said segmental gear, a gear connected to be turned by said segmental gear, a third bellows within said chamber, means for furnishing static air pressure to said third bellows, a third bellows head in said third bellows movable in response to variations in static air pressure, a spring within said third bellows connected to said third bellows head to oppose the urge of said third bellows, a rod rigidly attached to said third bellows head and extending into said means forming said chamber, a lever pivotally attached to said means forming said chamber to support the free end of said rod, a second lever pivotally connected to the end of said first lever and to a noncentral point on said gear, said noncentral point being positioned upon said gear to cause the urge of said third bellows to restrain the rotation of said gear from a predetermined position by an amount which is proportional to static air pressure and to the angle said gear has turned from said predetermined position, the spring constant of said spring being predetermined to produce a torque which is substantially equal to the torque produced by the spring effect of said first two bellows on said gear for small angular rotations of said gear, an induction type pickoff attached to said gear to detect electrically the rotation of said gear whereby changes in the ratio of ram air pressure to static air pressure are detected to thereby sense deviations in Mach number from said predetermined value with substantially the same sensitivity to deviations in Mach number throughout the range of altitude of said aircraft.

7. A device for measuring deviations of Mach number from a predetermined value, comprising means forming an evacuated chamber, a first bellows within said chamber responsive to ram pressure, a second and third bellows within said chamber responsive to static pressure, means for mechanically linking said first and said second bellows to oppose each other, the forces from said first and second bellows being equal at said predetermined Mach number value, a shaft, a mechanical linkage connecting said first linkage means and shaft to apply a torque proportional to said unbalanced force to said shaft, lever means connecting said third bellows to said shaft to apply a torque proportional to said static pressure and to the rotation of said shaft from a neutral position which represents said predetermined value in opposition to said torque applied by said unbalanced force, a spring, and means connecting said spring to said lever means in opposition to the spring effect of said bellows whereby deviation of Mach number from said predetermined value is measured with exactly the same sensitivity to deviation of Mach number at all altitudes.

8. A device for measuring deviations of Mach number from a predetermined value comprising means forming an evacuated chamber, a first bellows within said chamber responsive to ram pressure, a second and third bellows within said chamber responsive to static pressure, said first and second bellows being mechanically linked to oppose each other, the forces from said first and second bellows being equal at said predetermined Mach number value, a shaft, a mechanical linkage pivotally connected to said first and second bellows upon the line of application of the unbalanced force between said first and second bellows and to said shaft to apply a torque to said shaft proportional to said unbalanced force, a spring connected across said third bellows, said third bellows being lever connected to said shaft to apply a torque proportional to said static pressure and to the rotation of said shaft from a neutral position which represents said predetermined value of Mach number in opposition to said torque applied by said unbalanced force, said spring being connected to said shaft in opposition to the force of the spring effect of said bellows, and an electrical pickoff attached to said shaft whereby deviation of Mach number from said predetermined value is measured with substantially the same sensitivity to deviation of Mach number at all altitudes.

9. Means for detecting deviations from a predetermined value in Mach number with substantially equal sensitivity to deviation of Mach number throughout a wide range of altitude comprising means forming an evacuated chamber, a first closed bellows therein connected to move in response to ram air pressure variations, a second and third closed bellows therein connected to move in response to static air pressure variations, the area of the bellows head of said first bellows having a predetermined relation to the area of the bellows head of said second bellows, said predetermined relation depending upon said predetermined value of Mach number from which deviations are measured, rotation indicating means, said first and second bellows being connected so that their forces are in opposition, said first and second bellows being mechanically connected to said indicating means to move said indicating means in response to said unbalanced force, said third bellows being connected to said indicating means in opposition to said movement of said indicating means so that the restraint of said third bellows upon said indicating means is directly proportional to said static pressure, whereby said indicating means yields a measure of Mach number whose precision of response to deviations of Mach number is substantially independent of altitude.

References Cited in the file of this patent

UNITED STATES PATENTS

| Number | Name | Date |
|---|---|---|
| 1,847,086 | Gargan | Mar. 1, 1932 |
| 2,309,015 | Royer | Jan. 19, 1943 |
| 2,399,448 | Nyquist | Apr. 30, 1946 |
| 2,450,884 | Dawson et al. | Oct. 12, 1948 |

FOREIGN PATENTS

| Number | Country | Date |
|---|---|---|
| 232,931 | Switzerland | Sept. 16, 1944 |
| 600,620 | Great Britain | Apr. 14, 1948 |